United States Patent Office 3,303,896
Patented Feb. 14, 1967

3,303,896
PROCESS FOR DRILLING BOREHOLES IN THE EARTH UTILIZING AMINE OXIDE SURFACTANT FOAMING AGENT
Charles C. Tillotson, Blue Ash, Ohio, and Keith E. James, Harris, Tex., assignors to The Procter & Gamble Company, Cincinnati, Ohio, a corporation of Ohio
No Drawing. Filed Aug. 17, 1965, Ser. No. 480,522
1 Claim. (Cl. 175—69)

This application is a continuation in part of copending application Serial Number 266,519, filed March 20, 1963, now abandoned.

This invention relates to the removal of unwanted fluid from boreholes drilled in the earth. More particularly, it relates to an improved process of removing such fluid from a borehole in which an improved surfactant produces foam in the presence of an aqueous "intrusion fluid" which, for example, can contain salt, hydrocarbons, etc.

Rotary drilling methods wherein a drill bit positioned at the end of a drill pipe is rotated against the end of a borehole in the earth are well known. It is also well known that air and/or other gas introduced at the lower end of the hole can effectively act as a medium for effecting the upward removal of earth cuttings from the hole. In fact, the use of air in drilling is so effective that today air drilling is a commonly used drilling method. In order to aid in the removal of cuttings from the hole it is known to use a foam vehicle formed from the air and/or other gas so introduced. It is also known that unwanted aqueous intrusion fluids leak into the hole thereby agglomerating the cuttings and/or forming the cuttings into a paste or slurry which is not easily removed upward by the air and/or gas. It is also known that the introduction of various surfactants in the borehole will, under ordinary conditions, cause these underground intrusion fluids to form a foam which has a lighter density than the intrusion fluids per se and can be removed upward by air and/or gas.

Many surfactants have been suggested for use in producing these foams either with water or brine solutions which have been added to the borehole or which are present in the borehole as a result of subterranean leakage (see French Patent 1,192,395). These surfactants will not produce a foam in the presence of materials which are normally encountered in drilling holes in the earth or else require excessive amounts to form a foam under such conditions. For instance, the composition of the intrusion fluid often includes such materials as (1) dissolved salt; (2) suspended earthy material from drilling (drill cuttings) and/or (3) admixed organic matter such as crude oil. Extreme examples of these variables include (1) saturated brine containing metallic ions such as calcium and magnesium, (2) clays which have a high surface area or high ion exchange properties such as bentonite, and (3) crude oil which can range from a gas condensate to heavy asphaltic crudes. These materials which can comprise and contaminate the normally aqueous intrusion fluid tend to deplete, by physical or chemical interaction, the concentration of the surfactants available to produce foam and/or they may kill the foam completely. A surfactant which will be as effective a foam producer as the surfactants of this invention under a wide variety of conditions has heretofore not been known or used.

It is an object of this invention to provide a process for removing aqueous intrusion fluid from holes drilled in the earth which is applicable to a wide variety of earth formations.

It is a more specific object of this invention to provide an improvement for producing foam in a borehole in the presence of a wide variety of intrusion fluids.

The objects of this invention can be achieved by providing a method for removing aqueous intrusion fluid from boreholes in the earth which comprises the step of creating at the lower end of said borehole a foam, capable of removing said fluid upward, by the highly turbulent motion of a gas in the presence of a foam producing amount of a surfactant compound of the formula

wherein $R^1$ is a long chain alkyl group containing from about 10 to about 14 carbon atoms and $R^2$ and $R^3$ are selected from the group consisting of methyl, ethyl, and 2-hydroxy ethyl radicals, preferably said compound is present in a concentration in said aqueous fluid ranging from about 0.005% to about 1.0%.

The foam utilized as an intrusion fluid removal medium comprises a dispersion of air, nitrogen, natural gas, methane, etc., in an aqueous liquid to which has been added the amine oxide hereinbefore described. Water is normally the liquid constituent of the foam since it is the principal component of the intrusion fluid. Sometimes water is intentionally added to the borehole to aid in forming a foam, but in some cases it may be desirable to add to the hole intrusion fluid comprising a brine solution, e.g., in clay or shale strata which tend to hydrate and swell in contact with fresh water more than in brine.

The foam utilized to remove intrusion fluid from the borehole can be formed at the drill bit by incorporating the amine oxide in a stream of gas supplied to the bottom of the borehole through the hollow drill string. The turbulence created by the gas stream leaving the drill string at the bottom of the borehole agitates water at the bottom of the borehole sufficiently to complete mixing of the gas, aqueous liquid and amine oxide and produces large quantities of foam.

The amine oxide of this invention is particularly effective in removing intrusion fluids comprising heavy brine and brine-hydrocarbon mixtures. For instance, it has been shown that the amine oxide of this invention performs well in fresh water, in water containing salt (NaCl) at a level of from 5% up to saturated brine, alone and in combination with saturated lime water (about 0.3% calcium hydroxide), in saturated brines containing up to 90% kerosene and in brines containing bentonite and kerosene. A surfactant which is effective in producing foam under all of these conditions is highly desirable for air drilling. The amine oxide of this invention is particularly effective in concentrated brines in the presence of unusually large quantities of oil, and in certain types of clays where many other surfactants are normally relatively ineffective.

In drilling a typical borehole wherein clay or shale is encountered, the added injection fluid, as hereinbefore mentioned, should contain at least about 2% sodium and/or potassium chlorides and normally will not contain more than enough alkali metal chloride to saturate the solution (about 25% by weight). Before using less than 10% alkali metal chloride a test should be run on the soil to determine whether the lower amount will prevent swelling. Calcium and/or magnesium chlorides and/or hydroxides can be used with the alkali metal chlorides in amounts up to their respective saturation points in the added intrusion fluid.

In addition to the electrolytes there is normally up to about 0.3% (saturation) of lime (calcium carbonate) in the added intrusion fluid. (A solution saturated with lime is preferred.) This also helps stabilize the clay and/or shale.

The amine oxide is present in the added intrusion fluid in an amount from about .1% to about 5%. The larger amounts of amine oxides are used when larger amounts of organic material such as oil are encountered in the borehole.

The added intrusion fluid should have a pH of from about 8 to about 11. This can be achieved by adding any base such as sodium and/or potassium hydroxide, sodium and/or potassium carbonate, mixtures thereof, etc. The higher pH's help protect metal drilling equipment from corrosion.

The concentrations and pH's hereinbefore described with respect to this added intrusion fluid are those which should be present in the borehole in contact with the clay and/or shale. Accordingly, if there is intrusion water present, the amounts should be increased, e.g., up to twice the amounts needed to saturate the solution, to give the indicated conditions in the boreholes. The presence in the fluid of small particles of undissolved materials is not detrimental to the process and with sufficient agitation the undissolved particles will stay suspended.

The amine oxide is normally used in the process of this invention as an aqueous paste containing from 20% to about 30% surfactant compound. For use in colder climates the paste normally is mixed with a solvent such as methanol or ethanol and/or a salt such as NaCl to depress the pour point. Up to about 20% of the solvent is normally used.

The following examples are illustrative, but not limiting, of the practice of this invention.

*Example 1*

In the following table, results of tests of the process of this invention are compared with results of tests of the same process in which a typical anionic surfactant is used instead of the surfactant compounds of this invention.

In order to run meaningful tests under controlled conditions without expending large sums of money, removal of various aqueous intrusion fluids from boreholes was simulated by using a "standardized borehole." The "standardized borehole" was a glass cylinder. Similarly there was, of course, no actual drill string, and to create air bubbles, a fritted glass sparging tube was used. The fritted glass, containing many small holes, insured an adequate dispersion of air bubbles despite the small flow rate of air which was used under laboratory conditions.

The test method for this example involved the use of a "standardized borehole" which was a cylindrical glass container, 6 cm. in diameter and 43.5 cm. deep. Sufficient surfactant was added to give the indicated concentration after sufficient "intrusion fluid" of the character set forth was added to bring the total volume to 400 ml. The mixture was mixed and then aerated using a standardized drill string (fritted glass sparging tube) and a flow rate of approximately 1.5 liters of air per minute. The foam was permitted to rise and foam over (carry over) until the foam quit pouring out of the container. The foam remaining in the container was allowed to break (dissipate) and the remaining liquid was measured. The difference in the initial and final volumes of liquid expressed as a percent of the initial volume (percent carry over) was plotted on semi-log graph paper against the concentration of the surfactant. A higher percent carry over shows improved intrusion fluid removal. Duplicates of at least three concentrations were run and the averages of the duplications were plotted. The concentration for 50% carry over of intrusion fluid was determined graphically and the corresponding percent of surfactant was used to determine the pounds of surfactant needed to lift 100 barrels (approximately 35,000 pounds) of intrusion fluid.

The salt used to make up brine solutions was a technical grade of sodium chloride containing slight natural impurities of calcium, magnesium and iron. A slurry of bentonite clay was used to prepare intrusion fluids containing clay. The bentonite clay, which hydrates and which absorbs surfactants, is a type of clay often found in drilling. Bentonite hydrates readily in fresh water but hydration is retarded by brines. Kerosene and #2 diesel oil (which were used to represent subterranean hydrocarbons) were first filtered through silica gel to remove natural surface active materials.

In the following table amine oxide refers to a composition in which the surfactant is "middle cut" coconut alkyl dimethyl amine oxide. ("Middle cut" coconut alkyl comprised a mixture of lauryl and myristyl alkyl groups. As used herein, "middle cut coconut" refers to a chain length distribution as follows: 2% $C_{10}$, 66% $C_{12}$, 23% $C_{14}$, and 9% $C_{16}$.) Anionic detergent refers to a composition in which the surfactant is a blend of the ammonium salt of the sulfated condensation product of three moles of ethylene oxide with "middle cut" coconut fatty alcohol combined with the monoethanolamide of coconut oil fatty acids. (The chain length distribution of the fatty acids is as follows: .5% $C_6$, 9% $C_8$, 5.5% $C_{10}$, 50% $C_{12}$, 17% $C_{14}$, 7% $C_{16}$, and 11% $C_{18}$.) The sulfate was 37.5% by weight of the composition and the amide surfactant was 9% by weight of the composition.

RELATIVE PERFORMANCE OF SURFACTANTS FOR AIR/GAS DRILLING

[Amine oxide (AO), anionic detergent (AD)]

| Intrusion Fluid Composition | Percent Surfactant | Percent Carryover | | Concentration to Give 50% Carryover | | Relative Pounds Surfactant to Lift 100 Barrels of Intrusion Fluid | |
|---|---|---|---|---|---|---|---|
| | | AO | AD | AO | AD | AO | AD |
| Distilled Water | .00625 | 55.5 | 32.5 | .0056 | .0078 | 1.96 | 2.73 |
| | .0125 | 83.2 | 70.8 | | | | |
| | .025 | 90.8 | 83.8 | | | | |
| 20% NaCl (Balance Water) | .0025 | 34.0 | (¹) | .0034 | .049 | 1.19 | 17.2 |
| | .00625 | 71.0 | (¹) | | | | |
| | .0125 | 81.5 | 7.0 | | | | |
| | .025 | (¹) | 19.0 | | | | |
| | .05 | (¹) | 51.2 | | | | |
| | .10 | (¹) | 93 | | | | |
| Saturated NaCl Solution | .0025 | 47.2 | (¹) | .0027 | .059 | .94 | 20.6 |
| | .00625 | 73.2 | (¹) | | | | |
| | .0125 | 82.0 | (¹) | | | | |
| | .05 | (¹) | 39.0 | | | | |
| | .075 | (¹) | 69.8 | | | | |
| | .10 | (¹) | 95.5 | | | | |
| Saturated NaCl solution plus 1% #2 diesel Oil. | .0025 | 22.0 | (¹) | .0047 | .183 | 1.64 | 64.0 |
| | .00625 | 56.2 | (¹) | | | | |
| | .0125 | 63.2 | (¹) | | | | |
| | .175 | (¹) | 40.2 | | | | |
| | .20 | (¹) | 65.0 | | | | |
| | .25 | (¹) | 93.1 | | | | |
| 75% Saturated NaCl Solution 25% Kerosene. | .0025 | 26.8 | (¹) | .0046 | .205 | 1.61 | 71.8 |
| | .00625 | 58.2 | (¹) | | | | |
| | .0125 | 68.8 | (¹) | | | | |
| | .125 | (¹) | 1.2 | | | | |
| | .20 | (¹) | 34.2 | | | | |
| | .225 | (¹) | 74.0 | | | | |
| | .25 | (¹) | 78.2 | | | | |

See footnote at end of table.

RELATIVE PERFORMANCE OF SURFACTANTS FOR AIR/GAS DRILLING—Continued

| Intrusion Fluid Composition | Percent Surfactant | Percent Carryover | | Concentration to Give 50% Carryover | | Relative Pounds Surfactant to Lift 100 Barrels of Intrusion Fluid | |
|---|---|---|---|---|---|---|---|
| | | AO | AD | AO | AD | AO | AD |
| 25% Saturated NaCl Solution 75% Kerosene. | .00625 | 20.5 | (¹) | .0145 | .335 | 5.08 | 117 |
| | .0125 | 44.8 | (¹) | | | | |
| | .025 | 61.2 | (¹) | | | | |
| | .25 | (¹) | 15.2 | | | | |
| | .3125 | (¹) | 39.5 | | | | |
| | .375 | (¹) | 66.8 | | | | |
| 72.5% Saturated NaCl Solution, 25% Kerosene, 10% Bentonite (by weight). | 0.10 | 35.2 | 0 | .173 | Failed | 60.6 | Failed |
| | 0.15 | 44.8 | 0 | | | | |
| | 0.20 | 57.0 | 0 | | | | |
| | 2.00 | (¹) | 0 | | | | |
| Saturated NaCl solution, 0.3% Bentonite (by weight). | .0125 | 12.0 | (¹) | .039 | .048 | 13.6 | 16.9 |
| | .025 | 27.8 | 24.0 | | | | |
| | .05 | 62.8 | 51.8 | | | | |
| | .10 | 93.2 | 85.0 | | | | |
| Saturated NaCl Solution, 1% #2 Diesel Oil, 0.3% Bentonite (by weight). | .025 | 13.8 | -------- | 0.50 | .128 | 17.5 | 44.8 |
| | .05 | 50.0 | -------- | | | | |
| | .10 | 89.4 | -------- | | | | |
| | .125 | (¹) | 42.0 | | | | |
| | .145 | (¹) | 71.8 | | | | |
| | .20 | (¹) | 87.8 | | | | |
| 72.5% Saturated NaCl Solution, 25.0% Kerosene, 10% Bentonite (by weight), 0.3% lime (by weight). | .10 | 33.8 | 0 | .125 | Failed | 43.8 | Failed |
| | .15 | 57.8 | 0 | | | | |
| | .20 | 66.0 | 0 | | | | |
| | 2.00 | (¹) | 0 | | | | |

¹ Means that a percent carryover value was not determined for that particular concentration of that particular surfactant.

All compositions herein are given in percent by volume unless otherwise stated.

As used herein, "saturated NaCl solution" refers to an aqueous solution.

In all cases the process employing amine oxide resulted in markedly improved intrusion fluid removal.

*Example II*

During a field test in West Virginia, drilling competent shales at depths of from about 3400 to 4700 feet, an intrusion fluid made up of 12 to 14% oil (paraffin base crude) and fresh water was encountered in the borehole. Under these conditions a mixture of 22.7% coconut alkyl dimethyl amine oxide, 61.3% water and 16% methanol was introduced with highly turbulent air at the lower end of the borehole. The amine oxide proved to be an exceptionally good foaming agent and about twice as efficient as the anionic surfactant of Example I in removing the intrusion fluid upward from the borehole. When the corresponding diethyl and bis 2-hydroxyethyl coconut alkyl amine oxides are used in the process of this invention, similar good results are obtained.

*Example III*

The following formula is suitable for use as an intrusion fluid to be added to boreholes wherein clay and/or shale which will hydrate and swell in contact with fresh water is encountered.

| | Percent |
|---|---|
| NaCl | 10 |
| CaCl₂ | 1.5 |
| Soda ash | 2 |
| Lime | 0.3 |
| Amine oxide | 2 |
| Water | Balance |

The pH of the above solution is about 11. When the above formula was inserted into a borehole with compressed air as part of the circulating fluid ("mist drilling") excellent results were obtained in that the clay which was encountered did not swell and interrupt the drilling process and the foam produced was adequate.

When in the above example potassium salts are substituted, either wholly or in part, for the corresponding sodium salts and/or magnesium salts are substituted, either wholly or in part, for the calcium salts, substantially equivalent results are obtained in that the clay and/or shale do not swell to the same extent that they would with fresh water and an adequate foam is produced.

When the corresponding hydroxides are substituted, either wholly or in part, for the, e.g., calcium chloride and sodium carbonate in the above example, substantially equivalent results are obtained in that the swelling of the clay and/or shale is inhibited and the pH of the solution is about 11.

What is claimed is:

A process comprising
(1) drilling a borehole with a rotary drilling bit through a strata selected from the group consisting of clay, shale and mixtures thereof which tend to hydrate and swell in contact with fresh water,
(2) supplying to the bottom of the borehole an aqueous solution containing brine and foaming agent and so formulated that, when it mixes with any aqueous intrusion fluid of subterranean origin in said borehole, the aqueous fluid which is in contact with said strata has a composition consisting essentially of:
    (A) about 2% by weight of a foaming surfactant of the formula

wherein R¹ is a long alkyl chain group containing from about 10 to about 14 carbon atoms and R² and R³ are each selected from the group consisting of methyl, ethyl and 2-hydroxyethyl radicals;
    (B) about 10% of the electrolyte sodium chloride;
    (C) about 1.5% of the electrolyte calcium chloride;
    (D) about 2% soda ash, and about 0.3% lime; and
    (E) the balance, water, the pH of the fluid which is in contact with said strata being from about 8 to about 11;
(3) injecting gas having a highly turbulent motion into said borehole and thereby agitating the surfactant-containing aqueous fluid, which is in contact with said strata and creating an aqueous foam; and (4) removing the foam and suspended drill cuttings to the surface through the borehole by means of the upward movement of the gas.

References Cited by the Examiner

UNITED STATES PATENTS

| | | | |
|---|---|---|---|
| 2,169,976 | 8/1939 | Guenther et al. | 252—357 X |
| 3,076,508 | 2/1963 | Lissant | 166—43 X |
| 3,111,998 | 11/1963 | Crowley | 175—68 |
| 3,155,178 | 11/1964 | Kirkpatrick et al. | 166—44 X |
| 3,159,581 | 12/1964 | Diehl | 252—152 |

CHARLES E. O'CONNELL, *Primary Examiner.*

JACOB L. NACKENOFF, *Examiner.*

T. A. ZALENSKI, S. J. NOVOSAD, *Assistant Examiners.*